US008166538B2

(12) United States Patent (10) Patent No.: US 8,166,538 B2
Gbadegesin et al. (45) Date of Patent: Apr. 24, 2012

(54) UNIFIED ARCHITECTURE FOR REMOTE NETWORK ACCESS

(75) Inventors: Abolade Gbadegesin, Seattle, WA (US); Arvind M. Murching, Sammamish, WA (US); David G. Thaler, Redmond, WA (US); Henry L. Sanders, Kirkland, WA (US); Narendra C. Gidwani, Kirkland, WA (US); Paul G. Mayfield, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1525 days.

(21) Appl. No.: 11/178,219

(22) Filed: Jul. 8, 2005

(65) Prior Publication Data

US 2007/0011733 A1 Jan. 11, 2007

(51) Int. Cl.
*H04L 29/06* (2006.01)
(52) U.S. Cl. .............................. 726/12; 726/15; 713/152
(58) Field of Classification Search .................... None
See application file for complete search history.

(56) References Cited

U.S. PATENT DOCUMENTS

| 6,052,788 | A  | * | 4/2000 | Wesinger et al. ............... 726/11 |
| 6,128,664 | A  |   | 10/2000 | Yanagidate et al. |
| 6,473,406 | B1 | * | 10/2002 | Coile et al. .................... 370/248 |
| 6,529,513 | B1 | * | 3/2003 | Howard et al. ............... 370/401 |
| 7,167,920 | B2 | * | 1/2007 | Traversat et al. ............. 709/230 |
| 7,389,533 | B2 | * | 6/2008 | Bartlett et al. ................. 726/15 |
| 2003/0048796 | A1 |   | 3/2003 | Yabe et al. |
| 2003/0229718 | A1 |   | 12/2003 | Tock et al. |
| 2004/0158601 | A1 |   | 8/2004 | Wing et al. |
| 2004/0255164 | A1 |   | 12/2004 | Wesemann |
| 2004/0268121 | A1 |   | 12/2004 | Shelest et al. |
| 2005/0022012 | A1 |   | 1/2005 | Bluestone et al. |
| 2005/0060328 | A1 |   | 3/2005 | Suhonen et al. |
| 2006/0005240 | A1 | * | 1/2006 | Sundarrajan et al. ........... 726/15 |

FOREIGN PATENT DOCUMENTS

| JP | 11-122301 | 4/1999 |
| JP | 2002-164936 | 6/2002 |
| JP | 2002-208964 | 7/2002 |

OTHER PUBLICATIONS

International Search Report from corresponding International Application No. PCT/US06/26820, filed Jul. 10, 2006.
Office Action dated Jan. 27, 2011 from corresponding Japanese Patent Application No. 2008-520449.

(Continued)

*Primary Examiner* — Gilberto Barron, Jr.
*Assistant Examiner* — Virginia T Ho
(74) *Attorney, Agent, or Firm* — Wolf, Greenfield & Sacks, P.C.

(57) ABSTRACT

A unified architecture for enabling remote access to a network is provided. The network may comprise, as examples, a virtual private network (VPN) and/or a peer-to-peer network. In one embodiment, the architecture includes components installed on a client device/node and a gateway/supernode. Components implemented on the client device may facilitate access in a manner similar to that of a traditional VPN, while components on the gateway may facilitate access in a manner similar to an application proxy. Communication between the client device and gateway may occur, as an example, via a Secure Sockets Layer (SSL) communication protocol.

12 Claims, 7 Drawing Sheets

OTHER PUBLICATIONS

Tatsuya Baba, "Series: This is what you should know about a VPN. Understanding remote access mechanism using SSL-VPN" printed in pp. 130-135 of a separate volume Windows Server World of Network World No. 9, vol. 8, published (Aug. 1, 2004).

Katsuhiko Kanazawa "Use Web groupware away from home" and printed in pp. 76-79 of Network Magazine No. 5, vol. 10 published (May 1, 2005).

Office Action in Japanese Patent Application No. 2008-520449 dispatched Aug. 16, 2011.

* cited by examiner

UNIFIED ARCHITECTURE FOR REMOTE NETWORK ACCESS

FIELD OF INVENTION

This invention relates generally to communications networks, and more particularly to components enabling remote access to communications networks.

BACKGROUND OF INVENTION

A virtual private network (VPN) is a private network in which communication is transferred, at least in part, over public networking infrastructure such as the Internet. VPNs are widely used for communication within or between companies, as they may extend the geographic area over which users may connect with a company's network, reduce transit time and transportation costs for remote users, and improve worker productivity.

To connect to some VPNs, a user invokes one or more software components (e.g., a VPN client application) residing on his/her client device (e.g., a personal computer, personal digital assistant or other device) to establish connectivity. Invoking the software component(s) causes the client device to communicate with a network access gateway on the VPN which typically verifies the user's access credentials based on information provided by the software component(s). Once authentication occurs, applications running on the client device are typically able to access resources on the network as needed. A network resource may include, for example, a web page, data structure (e.g., file), or e-mail server. Each time an application on the client device requests access to a network resource, the gateway facilitates the connection. This arrangement is generally known as the "traditional VPN" model.

With other VPNs, economic and/or security concerns may cause other access techniques to be employed. For example, there has been a recent shift toward employing an application proxy with Secure Sockets Layer (SSL) technology to establish remote user access to a VPN. Briefly, in an arrangement wherein an application proxy is employed, before client applications may access resources on the network, a user employs a browser application running on the client device to navigate to a web page designated as an access point to the VPN. The user may supply login credentials via the browser application to gain access to the VPN. Upon authentication, other applications running on the client device may be able to access network resources without the user having to supply login credentials again. This arrangement is generally known as the "application proxy" model.

One reason for the shift toward the application proxy model is that it is less expensive for businesses to deploy, since software components enabling automatic authentication to the VPN need not be installed and maintained on all client devices. Another reason is that the application proxy model provides additional security benefits in that communication received at the access point may be more strictly monitored than in a traditional VPN arrangement, such that it may be more difficult for a malicious party to employ the client device to attack a corporate VPN.

SUMMARY OF INVENTION

Applicants have appreciated that one drawback associated with using the application proxy model to enable remote user access to a VPN is that generally, application programs on the client device, and in many cases their server counterparts, must be modified before client application programs are able to automatically access network resources upon client authentication. These modifications may present a serious challenge, as an example, to businesses that provide remote network access to employees via the application proxy model, as many of these businesses have thousands of applications in use across their respective user communities. For example, for each application program requiring modification, a business may be required to consult with the vendor of the application program to request the necessary modifications, implement the modifications, and roll them out to the user community. This process can be very expensive and time-consuming. Moreover, with some application programs there may be significant technical barriers to implementing the required modifications.

This is in contrast to the traditional VPN model, wherein applications running on the client device typically are able to seamlessly access network resources upon authentication, without modification. However, as described above, the traditional VPN model can be expensive to deploy because it may require installation of software components on the client device for individual authentication of each user. The traditional VPN model may also offer less application-specific security functionality.

To balance these competing concerns, many businesses employ the application proxy model for remote network access, but allow only a subset of applications running on client devices to access network resources. Thus, many businesses employ the application proxy model with the knowledge that some users may not be able to employ some functionality offered by certain applications (e.g., that which requires network access). This arrangement is less than optimal.

Accordingly, one embodiment of the invention provides an architecture for facilitating remote network access in a manner which provides the security benefits of the application proxy model and the seamless application access to network resources associated with the traditional VPN model, without requiring applications running on the client device to be modified.

In one embodiment, the architecture includes software-based components installed on both the client device and on a network access gateway for authenticating the client on the network. In one embodiment, components on the client include a Client Network Access Manager (CNAM) which, upon the occurrence of a predetermined event (e.g., an attempt by an application to resolve a network name), may automatically initiate communication with and facilitate authentication via a gateway to establish connectivity to a network. In one embodiment, the presence of the CNAM on the client device makes modifying other client applications unnecessary, thereby providing ease of use and functionality similar to the traditional VPN model. In one embodiment, the architecture also includes components installed on a network access gateway which provide many of the security benefits typically associated with the application proxy model.

Although embodiments of the invention may be useful for facilitating remote access to a VPN, the invention is not limited in this respect. For example, the architecture may be employed to facilitate access to any suitable type of private or semi-private network. As an example, the architecture may be deployed to enable access to a peer-to-peer network. Components may be provided for managing peer-to-peer communication, such as components which regulate bandwidth allocated thereto and/or which impose security policy thereon.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
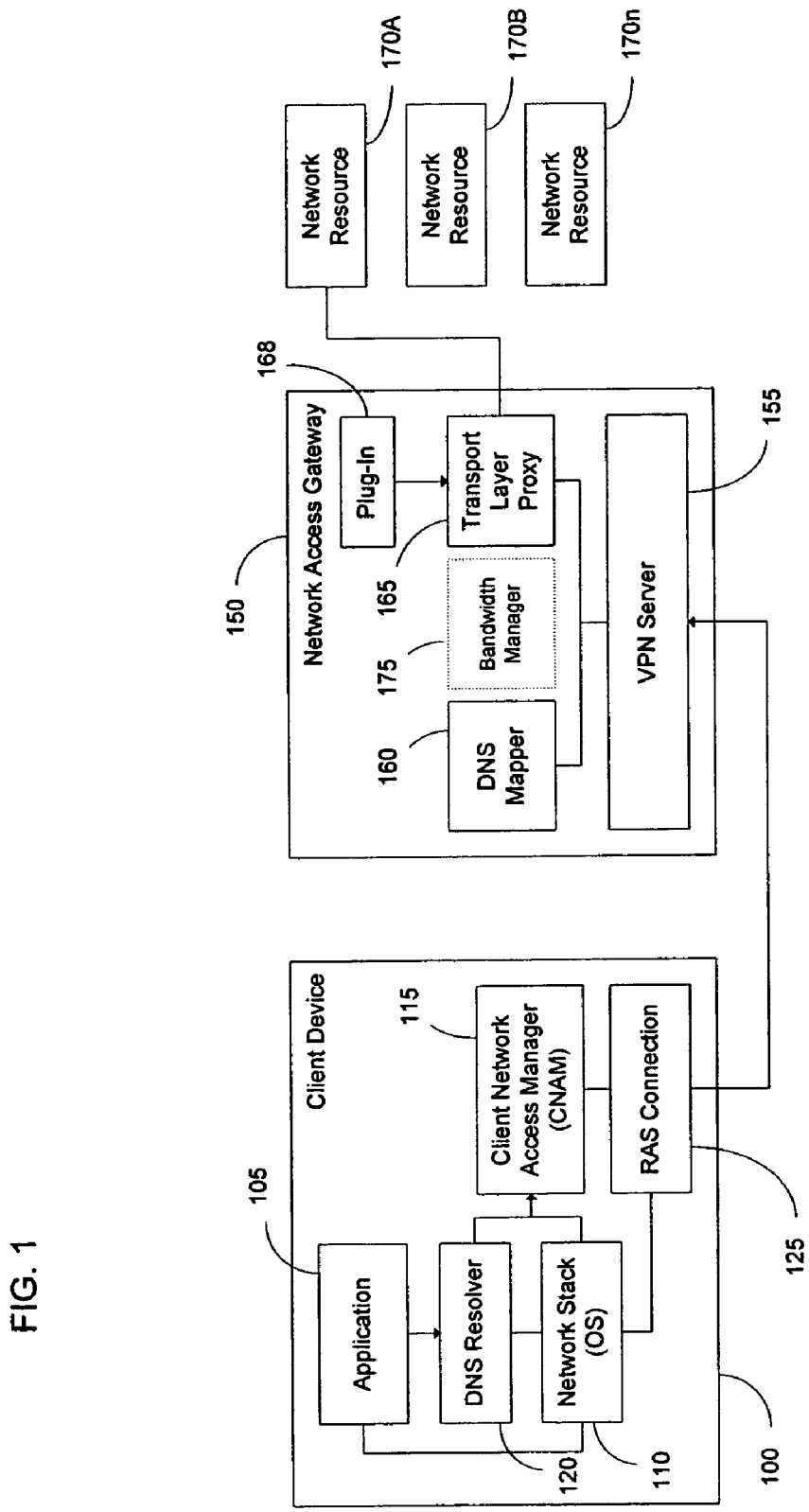
FIG. 1 is a block diagram depicting exemplary architecture components which may be used to facilitate remote network access, according to one embodiment of the invention.

One exemplary embodiment of the invention, used to facilitate remote access to a VPN, is shown in FIG. 1. The depicted embodiment includes architectural components which reside on client device 100 and network access gateway 150. Also shown in FIG. 1 are network resources 170 which are made accessible to client device 100 via these components. In one embodiment, each of the depicted components are implemented via software. However, the invention is not limited in this respect, as any or all of these components may be implemented in any suitable fashion, including via hardware.

The function of the components shown in FIG. 1 may be illustrated by describing the process of a client application accessing a resource 170A on the network. At the start of this process, a user may employ (e.g., provide input to) application 105 on client device 100. In one embodiment, application 105 comprises an e-mail application (e.g., Microsoft Outlook, offered by Microsoft Corporation of Redmond, Wash.), and network resource 170A comprises an e-mail server. The rest of the following description of FIG. 1 assumes that this is the case. However, it should be appreciated that the invention is not so limited, as any client application and/or network resource may be employed and/or accessed.

In the embodiment depicted, activity on application 105, such as an attempt by application 105 to resolve the name of a network resource, is detected by network stack 110 (which, in one embodiment, is a component of the operating system executing on client device 100). In this respect, those skilled in the art will recognize that because application 105 usually employs a different identifier for network resource 170A (e.g., a domain name) than the identifier which is used to identify network resource 170A on the network (e.g., a network address, such as an IP address), application 105 generally attempts to resolve the name of network resource 170A to determine its network identifier. It should be appreciated that activity need not be observed by a component (e.g., network stack 110) which is implemented as part of the operating system, as the invention is not limited in this respect. Any suitable component may be employed.

Of course, application 105 need not employ an identifier such as a domain name to access a network resource. For example, application 105 may employ a network address for the network resource, if it is available to the application. An exemplary scenario wherein the application specifies a network address is described below with reference to FIG. 4.

In the depicted embodiment, application 105 first communicates with domain name service (DNS) Resolver 120 to attempt to resolve the network name on the client. In one embodiment, DNS Resolver 120 maintains a collection of network identifiers for domain names which have been previously resolved, such as those for network resources that have been accessed as a result of previous application activity.

In the depicted embodiment, if DNS Resolver 120 is not able to provide the network address for network resource 170A to application 105 without consulting a DNS Server, then CNAM 115 is notified. In the depicted embodiment, CNAM 115 includes programmed instructions defining processing which is to occur when a predefined event occurs, such as when DNS Resolver 120 needs to resolve a domain name.

Figure 2:
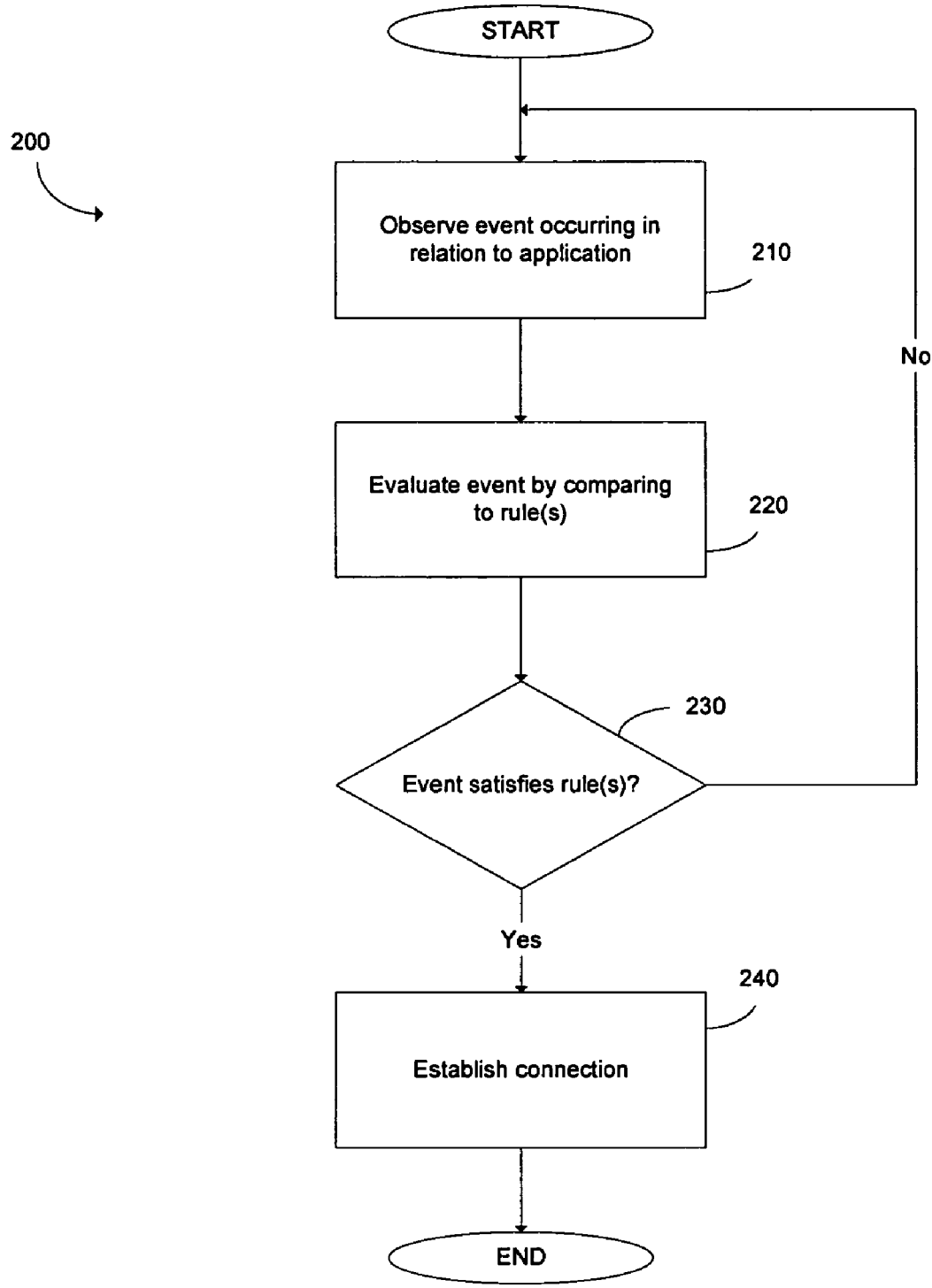
FIG. 2 is a flowchart depicting an exemplary process which may be performed by components on a client device for facilitating remote access to a network by the client device, according to one embodiment of the invention.

An illustrative embodiment of a process which is performed to evaluate whether an event related to an application executing on a client device should cause network connectivity to be established is shown in FIG. 2. Upon the start of process 200, an event which occurs in relation to an application is observed in act 210. The event may be, for example, an attempt by the application to resolve a network name. The event is evaluated in act 220 by comparing the event to one or more rules. For example, the event may be compared to one or more rules defined by programmed instructions comprised by CNAM 115. In act 230, a determination is made whether the event satisfies any of the rule(s). For example, it may be determined in act 230 that an attempt by application 105 to resolve a network name satisfies a rule. If it is determined that the application event satisfies any rule(s), a connection is established in act 240, and the process completes. Otherwise, the process returns to the beginning so that application events may continue to be observed.

Of course, the processing which may be performed upon observing an application event is not limited to establishing a connection to a network, and the event which defines the processing is not limited to an application attempting to resolve a network name. Any suitable event and/or processing may be defined. The programmed instructions defining the processing and/or event(s) may be, for example, defined by a user, such as a network administrator.

In the depicted embodiment, the processing which is to occur when the predetermined event takes place is that CNAM 115 evaluates the domain name which the DNS Resolver 120 is attempting to resolve, selects a specific DNS Server (i.e., DNS Mapper 160) based on the domain name (e.g., an association between the domain name and DNS Mapper 160), and instructs DNS Resolver 120 to contact DNS Mapper 160 to resolve the domain name.

It should be appreciated that DNS Mapper 160 may be selected from a plurality of similar DNS Server components, based on the domain name which is provided. In addition, because a DNS Server is selected based on domain name, if a domain name is not provided then the gateway need not be employed to facilitate communication between the client and network resource. This may be advantageous in implementations wherein the gateway is an access point to a VPN. For example, if gateway 150 is an access point to a VPN, it may not need to be employed to facilitate communication between client device 100 and a network resource which is publicly accessible via the Internet, if client device 100 provides, for example, a domain name which CNAM 115 determines should not be sent to DNS Mapper 160. The system may allow the client to access the network resource without accessing the VPN, thereby eliminating the processing overhead and expense associated therewith.

It should also be appreciated that a DNS Server need not be selected based solely on a domain name, as a DNS Server may be selected based on any suitable information. The invention is not limited to a specific implementation.

In the depicted embodiment, DNS Resolver 120 then attempts to contact DNS Mapper 160. This attempt is processed by network stack 110. If a connection is not already established, network stack 110 will instruct remote access service (RAS) Connection 125 to connect to network access gateway 150 so that application 105 may access network resource 170A. More particularly, RAS connection 125 is instructed to establish a point-to-point connection between client 100 and network access gateway 150. Those skilled in the art will recognize that establishing a point-to-point connection between the client and gateway establishes a network interface on client 100, similar to a traditional VPN arrangement and in contrast with the application proxy model. Because a network interface is established, an IP address will be assigned to client 100 in the steps described below for communication with the network.

RAS connection 125 then attempts to establish the point-to-point connection between client 100 and network access gateway 150 by contacting VPN Server 155. In the embodiment depicted, RAS connection 125 and VPN Server 155 establish and maintain the connection between client 100 and network access gateway 150, and this connection may persist until it remains idle (i.e., no communication is passed over the connection) for a configurable period. Those skilled in the art will recognize that the use of RAS components in this manner to establish and maintain a point-to-point connection between a client and gateway is common of traditional VPNs.

In one embodiment, communication between client 100 and network access gateway 150 occurs via the SSL protocol, although the invention is not limited in this respect. Any suitable communications protocol may be employed.

However, in accordance with one embodiment of the invention, rather than provide the actual network address (e.g., IP address) for network resource 170A to application 105, DNS Mapper 160 provisions a new network address, assigns it to VPN Server 155, and provides this newly provisioned address to DNS Resolver 120 on client 100. As a result, subsequent attempts by applications on client device 100 to access the network resource may be resolved on the client, such that communication with the DNS Mapper is not required.

In one embodiment, the newly provisioned address is dynamically generated by DNS Mapper 160. Specifically, in contrast with some conventional approaches, the new address is not provisioned (e.g., manually created) for use in accessing the network resource beforehand; it is generated by DNS Mapper 160 specifically for use by client 100 in accessing network resource 170A. The new address is also not derived from the actual network address via one or more algorithms. Also, in one embodiment the new address is not restricted to a specific format. For example, the address may be generated in IPv4, IPv6, or any other suitable format, such that an address may be dynamically generated in IPv4 format if it is known that, for example, either the client or the network resource employs IPv4 format.

In the depicted embodiment, DNS Mapper 160 also provides Transport Layer Proxy 165 with both the newly provisioned network address and the actual network address for network resource 170A. Because this process may be repeated many times, for many different network resources and/or client devices, VPN Server 155 may be provisioned with many IP addresses, one for each network resource.

Figure 3:
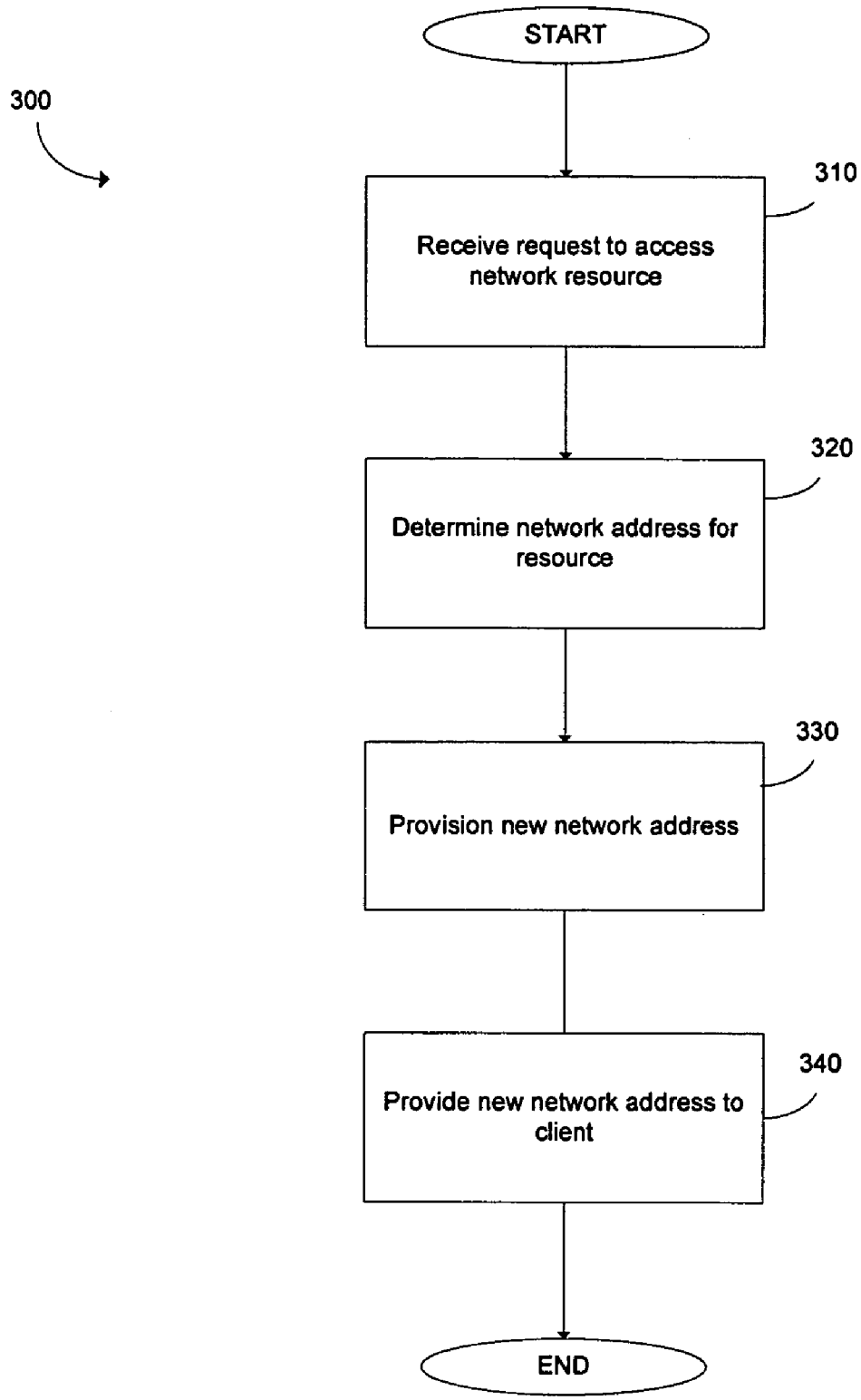
FIG. 3 is a flowchart depicting an exemplary process which may be performed by components on a server for facilitating remote network access, according to one embodiment of the invention.

A flowchart depicting an exemplary technique for performing the above-described process is shown in FIG. 3. Upon the start of process 300, a request to access a network resource is received in act 310. In act 320, the network address for the resource is determined (e.g., resolved, as described above). In act 330, a new network address is provisioned. The new address may be, for example, assigned to VPN Server 155. In act 340, the new address is provided to the client device for use in accessing the network resource. Upon the completion of act 340, the process ends.

As a result of this process, when application 105 subsequently attempts to access network resource 170A, it employs the newly provisioned network address. Application 105 sends an access request to this address, and the request is received by VPN Server 155. The request is then sent to Transport Layer Proxy 165, which, in the embodiment depicted, maintains information previously provided by DNS Mapper 160 that enables it to determine the network address for network resource 170A based on the newly provisioned network address. However, it should be appreciated that the actual network address for network resource 170A may be determined in any suitable fashion, as the invention is not limited in this respect.

In the depicted embodiment, rather than sending the request to network resource 170A, Transport Layer Proxy 165 terminates the access request on gateway 150 and establishes a direct connection to network resource 170A using its actual network address. Thereafter, communication from application 105 to network resource 170A travels first to gateway 150, and then from gateway 150 to network resource 170A along this newly-established connection. Similarly, communication from network resource 170A to application 105 travels first between network resource 170A and gateway 150, and then along the connection between gateway 150 and client 100. Thus, Transport Layer Proxy 165 serves as a proxy between application 105 and resource 170A.

In the depicted embodiment, Plug-in 168 is employed by Transport Layer Proxy 165 to implement security policy for the communication between application 105 and network resource 170A. Plug-in 168 may, for example, include programmed instructions which, when executed, examine communication between application 105 and resource 170A to determine whether it complies with the policy. As an example, Plug-in 168 may examine communication to determine that it is virus-free. However, it should be appreciated that any suitable policy may be applied, in any suitable fashion. For example, policy may be implemented which does not relate, directly or indirectly, to security. Further, policy need not be implemented by a plug-in to Transport Layer Proxy 165, as any suitable component may be employed. Additionally, policy may be defined, as an example, by a user (e.g., a network administrator, or third-party vendor or consultant). Also, a policy may define the examination of any communication traveling over gateway 150, including that which is directed to a resource such as a server, port and/or other resource.

It should be appreciated that the components and techniques described above provide many of the benefits of conventional VPN architectures without including their respective drawbacks. For example, the above-described architecture may provide the security benefits of the application proxy model, without requiring modifications to client applications to enable access to network resources. Similarly, the above-described architecture may facilitate the seamless access to network resources typical of a traditional VPN, without sacrificing security.

It should also be appreciated that the above-described architecture includes components on the client device which cause it to function much like a client device in a traditional VPN, and components on the network access gateway which cause it to function much like an application proxy. For example, CNAM 115 on client 100 may manage communication between applications (e.g., application 105) and network resources 170 in a manner similar to client components implemented in a traditional VPN, so that applications on the client device may seamlessly and transparently access network resources without being modified. Similarly, Transport Layer Proxy 165 and/or Plug-in 168 may provide a level of security comparable to the application proxy model by terminating access requests and inspecting communication on network access gateway 150.

As discussed above, although aspects of the invention may be useful in enabling remote access to a VPN, embodiments of the invention may have numerous uses, including uses relating to facilitating connectivity in other network configurations. For example, many of the components and techniques described above may be employed to facilitate connectivity in a peer-to-peer (P2P) network.

Those skilled in the art will recognize that peer-to-peer connectivity is accomplished primarily via supernodes which relay communication between nodes on the network. Supernodes typically are generally accessible to nodes (i.e., they do not reside behind firewalls, network access translator (NAT) components, or other devices preventing incoming connections), including nodes that reside behind a firewall, NAT or other security device. A computer is generally volunteered to be a supernode (e.g., by its owner, which may be an individual or business). Its identity as a supernode is typically published, such as via the peer-to-peer name resolution protocol (PNRP) offered by Microsoft Corporation of Redmond, Wash. Briefly, PNRP allows a supernode's identity and/or location to be published to a distributed database which is made available for access to nodes (e.g., on the Internet). When a client device launches a peer-to-peer application (e.g., Windows Messenger, produced by Microsoft Corporation of Redmond, Wash., or other peer-to-peer application), the application may query the database to discover the location and identity of a supernode.

In one embodiment, components installed on the client device 100 of FIG. 1 may be implemented on a peer-to-peer node, and components installed on the network access gateway of FIG. 1 may be implemented on a supernode, to facilitate access by the node to another node on a peer-to-peer network. One illustrative implementation is shown in FIG. 4.

Figure 4:
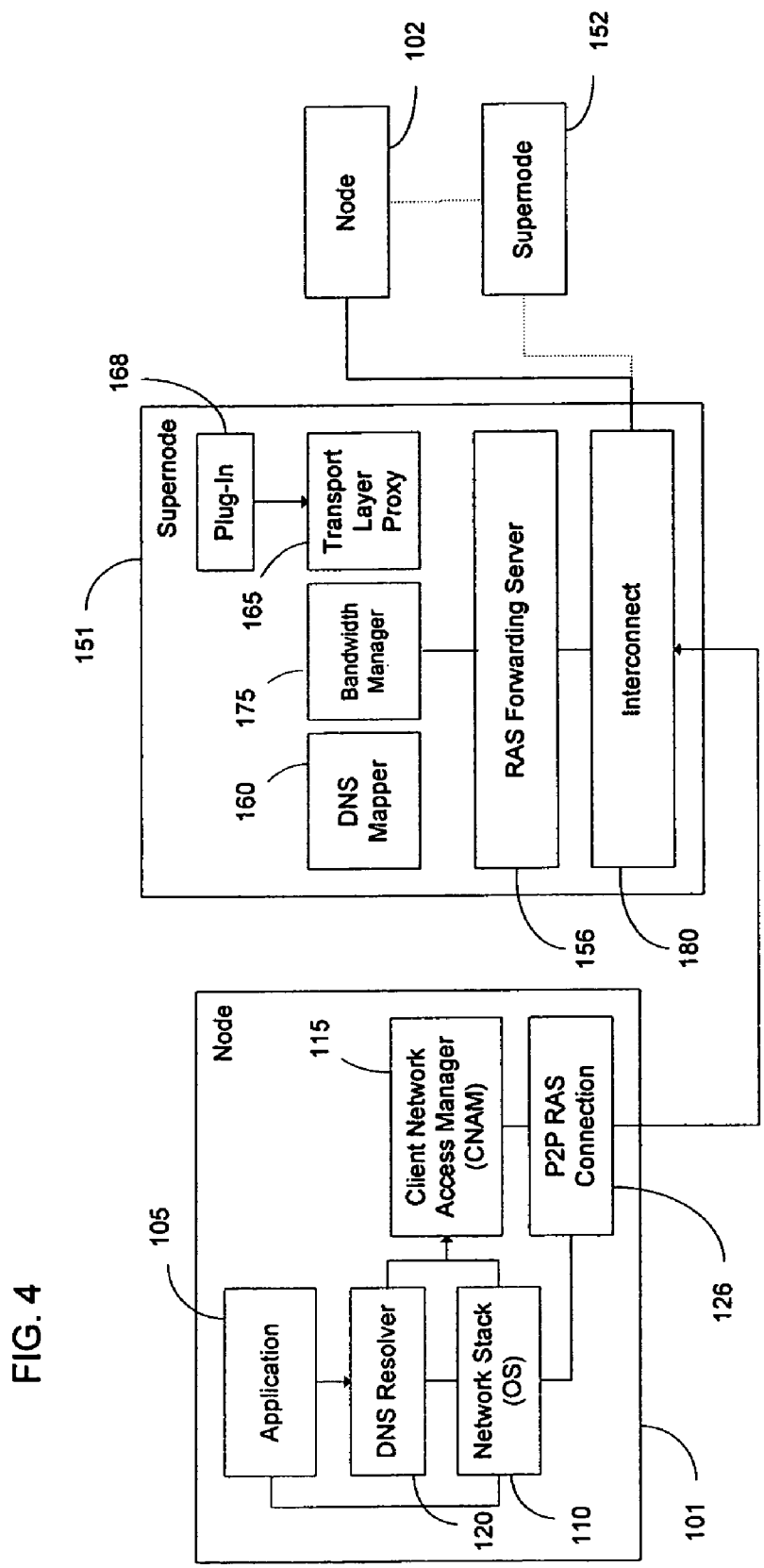
FIG. 4 is a block diagram depicting exemplary architecture components which may be used to facilitate access to a peer-to-peer network, according to one embodiment of the invention.

Many of the techniques performed by the components shown in FIG. 1 may be performed by the components shown in FIG. 4 to facilitate connectivity to a peer-to-peer network. As an example, node 101 may attempt to access supernode 151 as part of a "boot-strapping" process to obtain communication relay services provided by supernode 151. Network stack 110 may observe this event and notify CNAM 115, which may include programmed instructions defining processing which is to occur upon the occurrence of the event, such as the bootstrapping process. For example, CNAM 115 may cause a connection to be established between node 101 and supernode 151 via peer-to-peer RAS connection 126 and RAS Forwarding Server 156. The supernode may then assign node 101 a network address (e.g., an IP address).

As with the embodiment depicted in FIG. 1, communication between node 101 and supernode 151 may occur via the SSL communications protocol, or any other suitable communications protocol.

Supernode 151 may notify node 101 of other nodes which are accessible via the network. Node 101 may issue a request to access node 102 which specifies the network address of node 102. Specifically, node 101 may send a transmission control protocol (TCP) connection request (e.g., a send packet request) to supernode 151, which may examine the destination network address (e.g., IP address) specified by node 101 for the request, determine that it corresponds to a node which is still accessible via the network, and upon determining that node 102 remains accessible, forward the request. Node 102 may accept or reject the access request.

In one embodiment, because communication between nodes on a peer-to-peer network flows through the supernode without being terminated at Transport Layer Proxy 165, there is no need for DNS Mapper 160 to resolve an identifier provided by node 101 or provision a new network address and provide it to node 101, as in the configuration shown in FIG. 1. Instead, communication is directed to, and flows through, supernode 151 to node 102.

There may be more than one supernode on a peer-to-peer network, and all nodes may not be directly accessible to each supernode. If node 102 is not directly accessible by supernode 151, communication may be forwarded by supernode 151 to another supernode which can directly access node 102. Thus, in one embodiment, supernode 151 includes Interconnect 180, which determines whether node 102 is directly accessible to supernode 151, and if not forwards the communication to supernode 152 for eventual delivery to node 102.

In one embodiment, supernode 151 includes Bandwidth Manager 175, which may regulate bandwidth occupied by traffic traveling over the supernode. This may be useful, for example, when supernode 151 is a computer volunteered by a party who wishes to also employ the computer for other activities requiring network access (e.g., browsing the world-wide web). For example, Bandwidth Manager 175 may ensure that sufficient bandwidth is reserved for these other activities not related to the computer's role as a supernode. In one embodiment, Bandwidth Manager 175 may be configurable (e.g., by a user, such as a network administrator) to alter the amount of reserved bandwidth.

Figure 5:
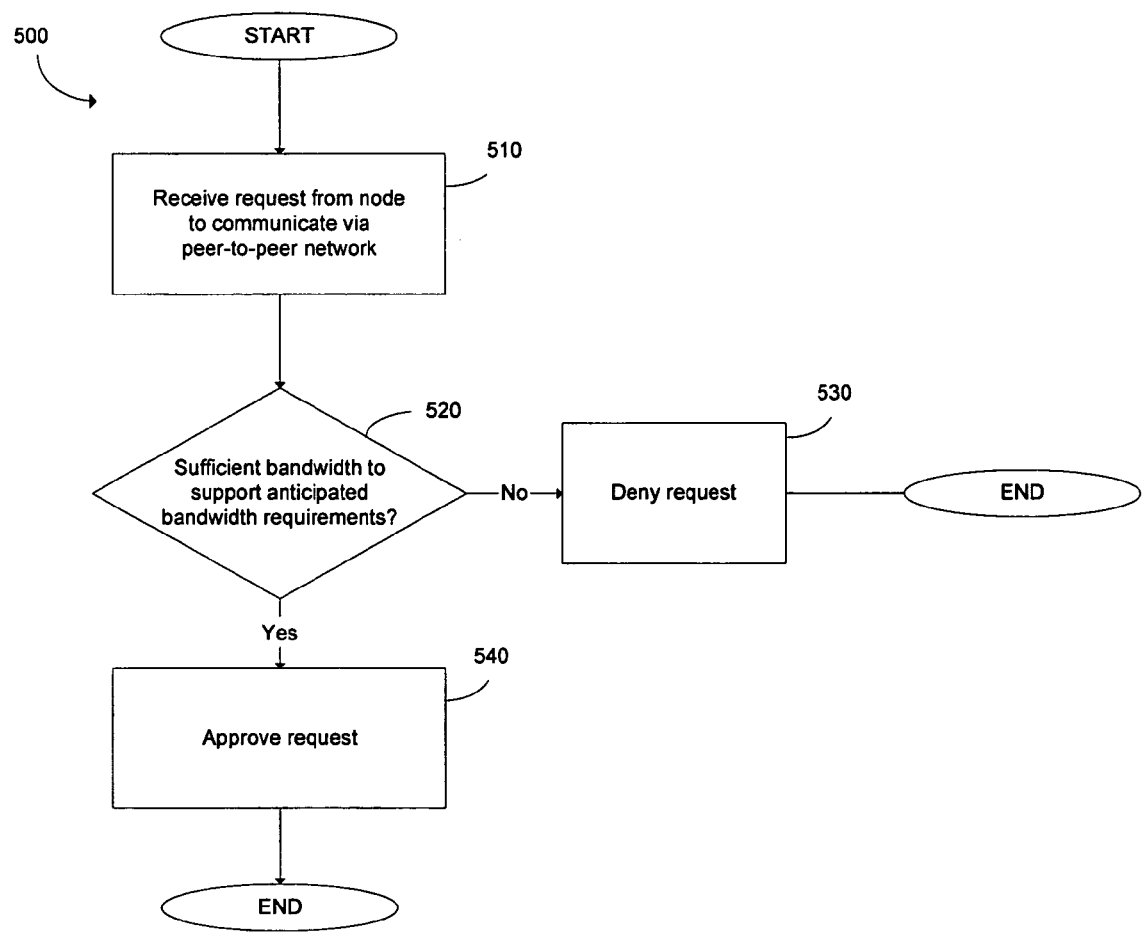
FIG. 5 is a flowchart depicting an exemplary process which may be performed by a supernode to regulate bandwidth allocated to peer-to-peer communication, according to one embodiment of the invention.

An exemplary technique which may be used to regulate the bandwidth which is allocated to peer-to-peer communication is shown in FIG. 5. Process 500 may commence when a node issues a request to a supernode to communicate via the peer-to-peer network, such as when the node bootstraps. Upon the start of process 500, in act 510 the request from the node to communicate via the peer-to-peer network is received by the supernode. The request may include information on anticipated bandwidth requirements for a transfer of information between the node and a second node. The anticipated bandwidth requirements may be determined using any suitable technique, such as by examining previous communication activity performed by the node.

In act 520, the request is examined to determine whether the supernode has sufficient bandwidth to support the anticipated bandwidth requirements. For example, Bandwidth Manager 175 on supernode 151 may initially allocate a first portion of bandwidth to peer-to-peer activities and a second portion to other activities.

In addition, the supernode may be actively engaged in supporting peer-to-peer communication between other nodes on the network. As a result, the supernode may examine the amount of bandwidth initially allocated to peer-to-peer activities, the amount of bandwidth devoted to ongoing peer-to-peer communication, and/or other information to make a determination whether sufficient bandwidth exists to support the anticipated bandwidth requirements provided by the node.

If it is determined that sufficient bandwidth does not exist to support the anticipated bandwidth requirements, in act 530 a communication denying the request is sent by the supernode to the node, and the process ends. For example, the supernode may send a message to the node which specifies that the request has been denied for lack of sufficient bandwidth. The node may, for example, then send a similar connectivity request to another supernode.

If it is determined in act 520 that the supernode has sufficient bandwidth to support the anticipated bandwidth requirements, then in act 540 a communication approving the request is sent by the supernode to the node. Upon the completion of act 540, the process completes. Thereafter, the node may send a communication to another node via the supernode. The communication may be transmitted by the supernode to the other node directly, or may be transmitted to another supernode for eventual delivery to the other node.

In one embodiment, Plug-in 168 may be employed to impose policy (e.g., related to security) on traffic which is relayed and/or transmitted by supernode 151. For example, if supernode 151 is used for peer-to-peer connectivity between users on a business's network, the business may employ Plug-in 168 to ensure that communication between users is virus-free.

Figure 6:
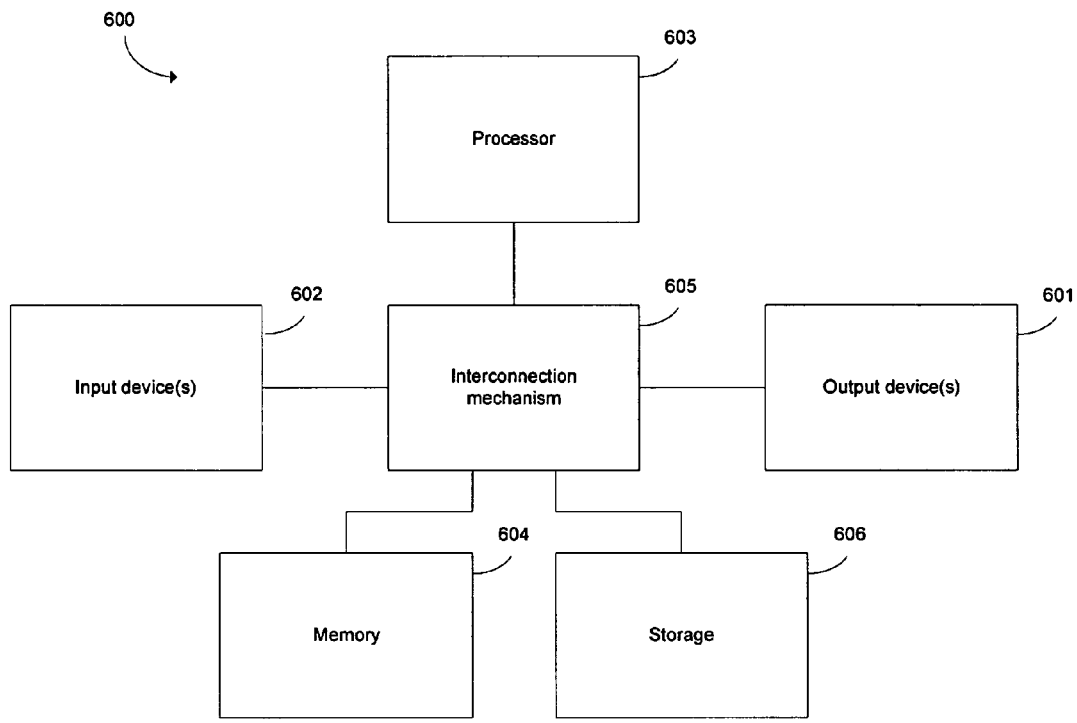
FIG. 6 is a block diagram depicting a computer on which aspects of embodiments of the invention may be implemented.

It should be appreciated that various aspects of embodiments of the invention may be implemented on one or more computer systems, such as the exemplary computer system 600 shown in FIG. 6. Computer system 600 includes input devices 602, output devices 601, processor 603, memory system 604 and storage 606, all of which are coupled, directly or indirectly, via interconnection mechanism 605, which may comprise one or more buses or switches. The input devices 602 receive input from a user or machine (e.g., a human operator, or telephone receiver), and the output devices 601 display or transmit information to a user or machine (e.g., a liquid crystal display).

The processor 603 executes a program called an operating system which controls the execution of other computer programs, and provides scheduling, input/output and other device control, accounting, compilation, storage assignment, data management, memory management, communication and data flow control. The processor and operating system define the computer platform for which application programs in other computer programming languages are written.

The processor 603 may also execute one or more programs to implement various functions, such as those which embody aspects of the invention. These programs may be written in a computer programming language such as a procedural programming language, object-oriented programming language, macro language, or combination thereof.

Figure 7:
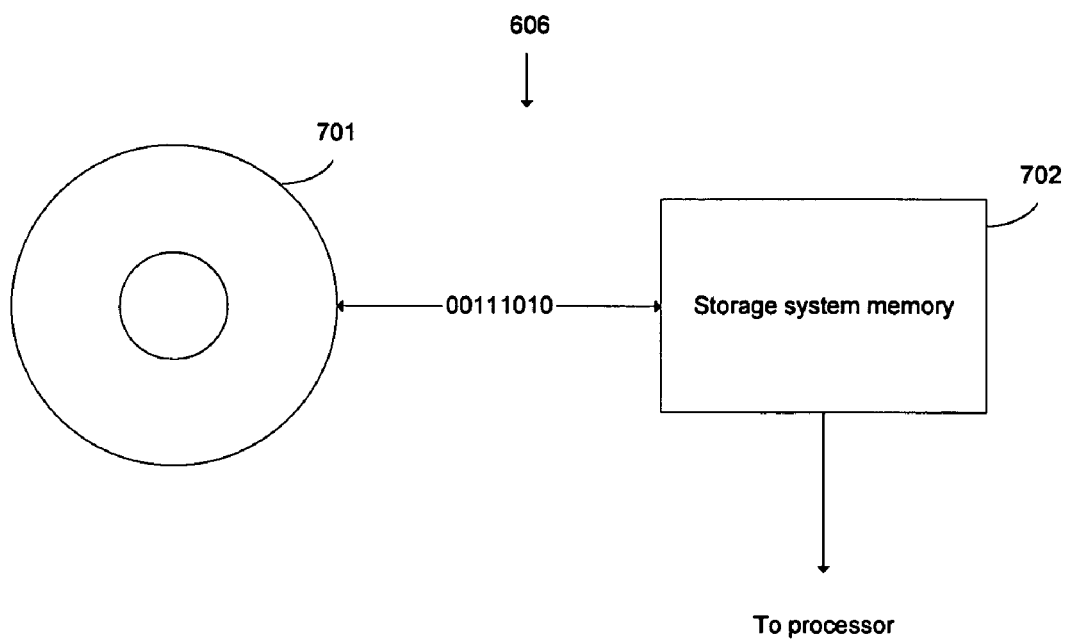
FIG. 7 is a block diagram depicting an exemplary memory on which aspects of embodiments of the invention may be implemented.

These programs may be stored in storage system 606. The storage system may hold information on a volatile or non-volatile medium, and may be fixed or removable. The storage system is shown in greater detail in FIG. 7. It typically includes a computer-readable and writeable nonvolatile recording medium 701, on which signals are stored that define the program, or information to be used by the program. The medium may, for example, be a disk or flash memory. Typically, in operation, the processor 603 causes data to be read from the nonvolatile recording medium 701 into a volatile memory 702 (e.g., a random access memory, or RAM) that allows for faster access to the information by the processor 603 than does the medium 701. This memory 702 may be located in storage system 706, as shown in FIG. 7, or in memory system 604, as shown in FIG. 6. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is also not limited to a particular memory system 604 or storage system 606.

It should also be appreciated that the above-described embodiments of the invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that the above-discussed functions of the agent can be distributed among multiple processes and/or systems. It should further be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. In a system comprising a client device, a gateway system and a network resource which are in communication via a network, the client being capable of accessing the network resource via communication over the network with the gateway system, the network resource being identified on the network by a first network address, the first network address having a first format, the first format being one of a plurality of formats, at least one storage device having instructions recorded thereon, which instructions, when executed by the gateway system, perform a method comprising acts of:

(A) receiving a first request from the client device to access the network resource, the first request specifying either a name which is used by the client device to identify the network resource or a network address;

(B) determining whether the first request specifies a name or a network address;

(C) upon determining in (B) that the first request specifies a name:

(C1) processing the first request to determine the first network address for the network resource based on the name;

(C2) dynamically generating a second network address specifically for use by the client device in accessing the network resource, the second network address not being provisioned for use in accessing the network resource before the act (B) is performed, the second network address not being restricted to complying with the first format;

(C3) providing the second network address to the client device for use in accessing the network resource;

(C4) receiving a second request from the client device to access the network resource, the second request being directed to the second network address;

(C5) terminating the second access request received from the client device;

(C6) establishing a direct connection to the network resource; and (C7) facilitating communication between the client device and the network resource via the direct connection; and (D) upon determining in (B) that the first request specifies a network address:

(D1) determining whether sufficient bandwidth is allocated on the gateway to support transmission of the first request; and (D2) upon determining that sufficient bandwidth is allocated, forwarding the first request to the network resource at the first network address.

2. The at least one storage device of claim 1, wherein the act (C6) further comprises imposing a security policy on the communication between the client device and the network resource.

3. The at least one storage device of claim 2, wherein the act (C6) comprises determining that the communication between the client and the network resource does not include a virus.

4. The at least one storage device of claim 1, wherein the act (C6) further comprises facilitating communication between the client device and the gateway system via a Secure Sockets Layer (SSL) protocol.

5. The at least one storage device of claim 1, wherein the gateway system comprises a supernode on a peer-to-peer network on which the client device comprises a first node and the network resource comprises a second node.

6. The at least one storage device of claim 1, wherein the act (D2) further comprises, prior to forwarding the first request to the network resource, imposing a security policy on the first request.

7. The at least one storage device of claim 6, wherein the act of imposing the security policy further comprises determining that the first request does not include a virus.

8. The at least one storage device of claim 1, wherein the gateway system on which the instructions are executed is a single device.

9. A system comprising:

a client device, a first gateway system of a plurality of gateway systems, and a network resource;

the client device, first gateway system and network resource being in communication via a network;

the client device being operable to select the first gateway system from the plurality of gateway systems based on an identifier used by the client device to identify the network resource;

the client device being further operable to access the network resource by issuing a first request comprising the identifier via the network to the first gateway system, the identifier specifying either a name used by the client device to identify the network resource or a network address used to identify the network resource on the network;

the first gateway system being operable to process the first request to determine whether the first request specifies a name or a network address; and to:

upon a determination that the first request specifies a name:

process the first request to determine a first network address for the network resource based on the name;

dynamically generate a second network address specifically for use by the client device in accessing the network resource, the second network address being generated subsequent to issuance of the request by the client device;

provide the second network address to the client device;

receive a second request from the client device to access the network resource at the second network address;

terminate the second request to access the network resource received from the client device;

establish a direct connection with the network resource at the first network address;

facilitate communication between the client device and the network resource via the direct connection between the first gateway system and the network resource; and upon a determination that the first request specifies a network address, forward the first request to the network resource at the network address.

10. The system of claim 9, wherein the request is transmitted via an SSL protocol.

11. The system of claim 9, wherein, upon a determination that the request specifies a network address, the first gateway system is further operable to determine whether sufficient bandwidth is available on the first gateway system to support the request.

12. The system of claim 9, wherein the first gateway system is further operable to impose a security policy on the request.

* * * * *